May 2, 1933.   R. J. NORTON   1,906,711
BRAKE SHOE
Filed May 20, 1930

Inventor
RAYMOND J. NORTON

Patented May 2, 1933

1,906,711

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE SHOE

Application filed May 20, 1930. Serial No. 454,078.

This invention relates to improvements in brakes and more particularly to a brake shoe structure.

Due to the requirement of light weight and high strength, the problem of providing efficient brakes for aeroplanes is a difficult one. The usual type of brake assemblage comprises a pressed steel drum with which cooperates an internal expanding shoe usually constructed of steel. It is advantageous both from the viewpoint of mechanical strength and also from commercial facility to join the separate members of the brake assemblage by welding so as to provide strong integral structures.

Due to the requirement of light weight the use of steel in aeroplane structures has been considerably restricted, but this is necessitated in certain parts because of the desirability of using welded parts.

It is an object of this invention to provide a brake member for aeroplanes comprising a unitary member of welded light weight alloys.

Another object of the invention is to provide a light weight alloy brake shoe.

Yet another object is to provide a light weight alloy brake shoe including welded sections.

With these and other equally important objects in view, the invention comprises the provision of a brake shoe of a light weight alloy of aluminum-copper-magnesium-silicon. In the preferred form this shoe is made up of a circumferential braking flange and a welded rigidifying radial flange. In order to further diminish the weight factor while retaining the requisite strength in the finished element, one or both of these flanges may be of a type of reticulated metal construction.

Figure 1:
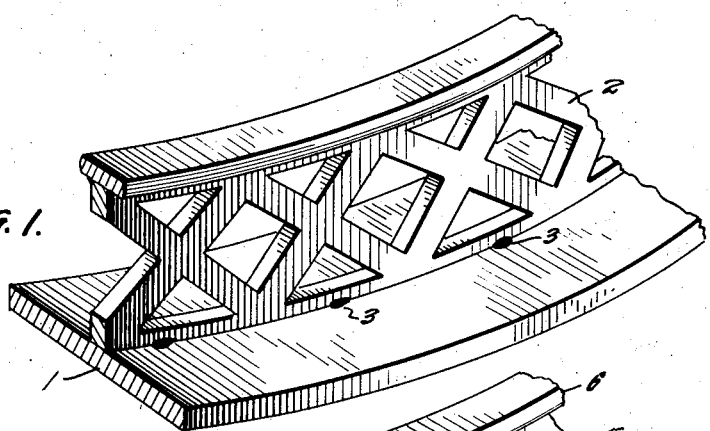

In order to more clearly explain the invention the preferred modifications of it are shown in the accompanying drawing in which:

Figure 1 is an enlarged detail of a shoe section.

Figure 2:
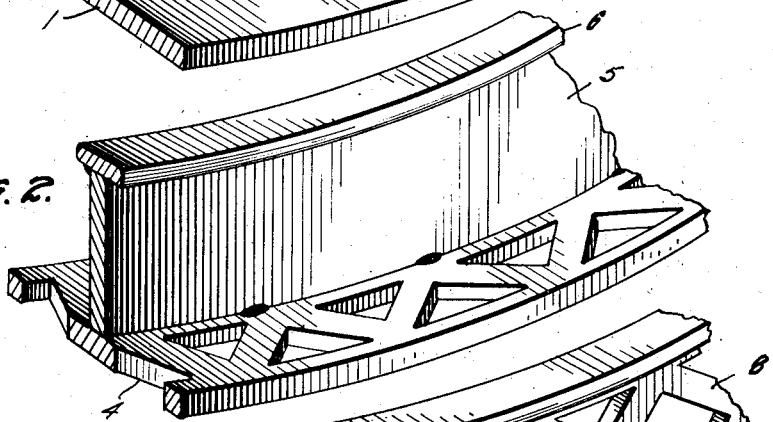
Figure 3:
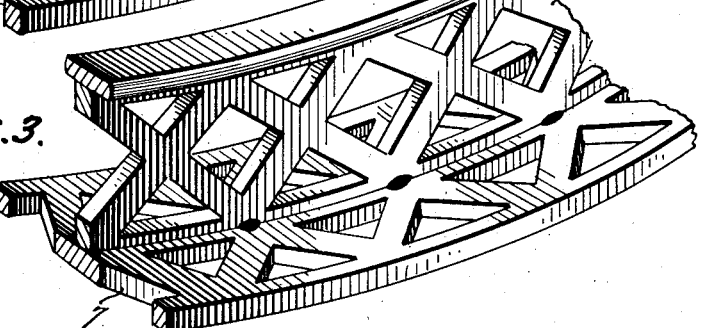
Figure 4:
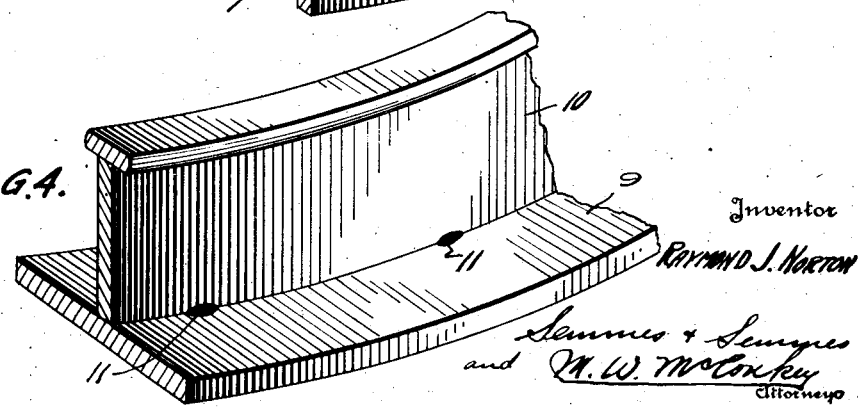

Figures 2, 3, and 4 are views similar to Figure 1, but showing differential modifications.

In accordance with the present invention, a brake shoe particularly adapted for aeroplane use may be made up by welding to a circumferential brake flange a rigidifying radial flange. These flanges are composed of the aluminum alloy above referred to and may be secured together with any suitable type of weld by employing a proper welding wire and flame. As is well-known, parts of such alloy may be welded together by use of 4½ per cent. silicon wire and an oxyhydrogen flame. The particular welding rod is chosen because of its low melting point with respect to the alloy to be welded. The oxyhydrogen flame is chosen because it is cleaner and not as hot as the oxyacetylene flame.

As shown in the drawing, the brake shoe comprises a circumferential flange 1, composed of a strong weldable alloy of aluminum and a strengthening or rigidifying radial flange 2. The radial flange may have a web portion of reticulated metal having a configuration similar to that generally found in expanded metal so as to cut down on the mass of the metal while retaining full strength. These two flanges may be welded together at their intersection by any suitable form of welded joint by employing the welding rod and flame hereinbefore described, as indicated, for example, at 3. These joints may be spaced along the circumference of the members.

In lieu of the particular flanges shown in Figure 1 those described in Figure 2 may be employed. The circumferential flange 4 may be constituted by a reticulated metal section and the radial flange 5 may comprise a solid web portion having the terminal integral cap 6.

As in the modification shown in Figure 1 these elements may be suitably welded together. If it is desired to provide a shoe structure having a very high ratio of strength to weight, both the circumferential and radial flanges may be of reticulated metal. This type of structure is shown in Figure 3 in which the circumferential flange 7 and the radial flange 8 are each formed from blanks having sections cut out so as to present a type of reticulated metal construction.

As shown in Figure 4 the complete shoe may be made up of a solid circumferential flange 9 and a solid radial web 10 welded together by any suitable form of weld as indicated at 11.

In each of the modifications it will be understood that the flange members may be formed up immediately after the quenching operation while the alloy is still relatively soft and workable and before any appreciable aging or hardening has taken place.

It will be appreciated that the brake shoe herein described is eminently strong and light. The high tensile properties of the aluminum alloy previously referred to compare very favorably with those of steel and its specific gravity renders it particularly useful where light weight is desired. The provision of a brake member made up of separate parts made integral by welding provides an especially strong construction.

In the use of this particular type of brake it is desirable to protect the shoe against high temperatures. The thermal problem in aeroplane braking, however, is not a difficult one, due to the relatively short period of time that the brakes are applied. In using the aluminum alloy it is advisable to protect this metal from generated friction heat at least to the extent of keeping the temperature below 150° C. This is accomplished by the reticulated configuration of the metal which, while still retaining the necessary strength, greatly increases the surface to volume ratio of the parts for which it is used, thus insuring a greater emission of heat and a consequent cooling of such parts. If it is desired to secure high corrosion resistance, the brake shoe may be coated with pure aluminum so as to provide electrochemical protection for the aluminum alloy and prevent intercrystalline corrosion.

I claim:

1. A brake shoe comprising reticulated light weight aluminous alloy parts.

2. A brake shoe comprising reticulated light weight aluminous alloy parts welded together.

3. A brake shoe comprising a reticulated circumferential flange and a reticulated radial flange said flanges being formed of a non-ferrous alloy and welded together.

4. A brake shoe comprising welded reticulated non-ferrous sections.

5. A brake shoe structure comprising a circumferential braking flange of a reticulated non-ferrous alloy, a strengthening web of a reticulated non-ferrous alloy positioned centrally of the circumferential braking flange and secured thereto at spaced portions throughout its length by spot welds.

In testimony whereof I affix my signature.

RAYMOND J. NORTON.